Sept. 28, 1965 R. E. MYER 3,209,135

ANALOG DIVISION CIRCUIT

Filed Sept. 10, 1962 2 Sheets-Sheet 1

INVENTOR
R. E. MYER
BY Walter M. Hill
ATTORNEY

INVENTOR
R. E. MYER
BY
Walter M. Kiel
ATTORNEY

United States Patent Office 3,209,135
Patented Sept. 28, 1965

3,209,135
ANALOG DIVISION CIRCUIT

Robert E. Myer, Denville, N.J., assignor to Bell Telephone Laboratories, Incorporated, New York, N.Y., a corporation of New York Filed Sept. 10, 1962, Ser. No. 222,717
4 Claims. (Cl. 235—196)

This invention relates to an analog division circuit for rapidly producing the quotient of two numbers which may be represented by direct voltages.

The operation of analog division is very commonly performed by apparatus involving servo mechanisms. Aside from the bulk and cost of such systems, an appreciable time is required to perform the division operation. It is desirable that an all electronic system be devised capable of rapidly executing the division operation so that the results may be used in data processing with only very short delay after receiving the dividend and the divisor information.

It is an object of this invention to simplify and make more compact electrical analog division circuits and at the same time to materially increase their speed of operation.

The foregoing object is achieved by this invention which comprises a capacitor which may be charged to a voltage representative of the dividend and is discharged through a constant current circuit, the discharge current being adjusted to represent the divisor. The resulting capacitor voltage is of triangular wave form with a time duration proportional to the required quotient. This time duration is converted into a voltage representative of the quotient by a rectangular wave generator which receives the triangular waveform and generates a constant amplitude wave of time duration equal to that of the triangular wave. The rectangular wave output from this generator causes a second capacitor to charge at a constant rate so that, when the rectangular wave ends, the resulting voltage on the second capacitor is a direct measure of the desired quotient. By providing a means for developing a direct voltage proportional to the peak amplitude of a voltage pulse, the invention is also capable of obtaining the quotient between the peak values of voltage pulses as well as the ratio of two direct voltages.

The invention may be better understood by reference to the accompanying drawings, in which.

Figure 1:
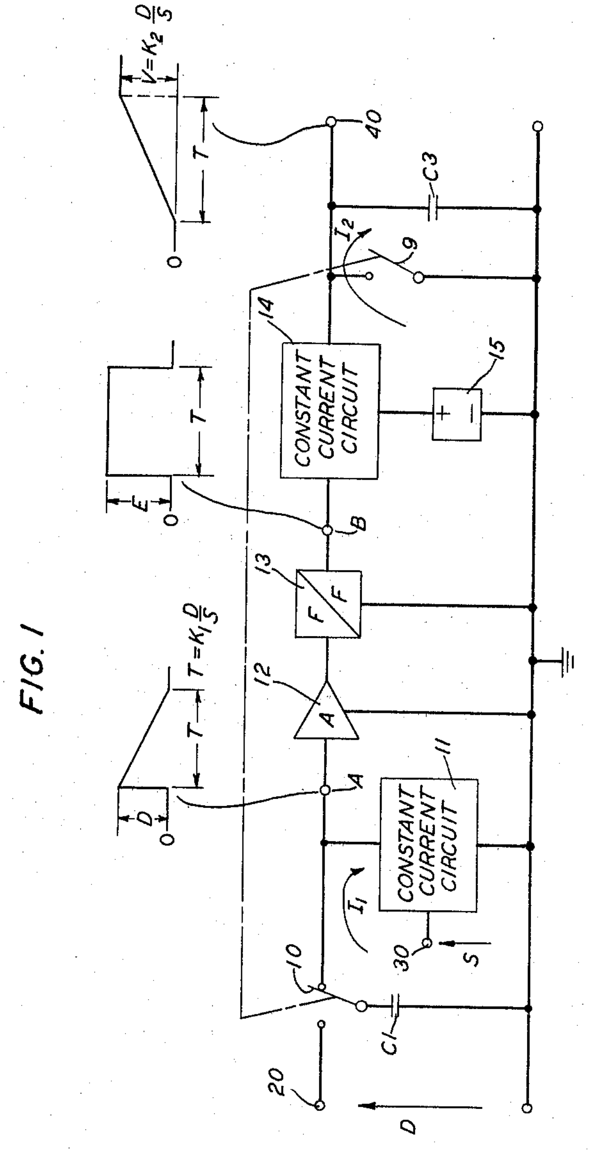
FIG. 1 is a block diagram illustrative of the principles of this invention.

In FIG. 1, capacitor C1 is the first capacitor which receives the charge representative of the dividend while a capacitor C3 has developed across its terminals a voltage proportional to the desired quotient. It will be noted that the lower terminal of both capacitors is connected to ground and that the upper terminal of capacitor C1 is connected to a switch which may transfer the capacitor from input terminal 20 to the constant current circuit 11. The voltage D, representing the dividend, is impressed between ground and input terminal 20 and, when switch 10 connects capacitor C1 to terminal 20, capacitor C1 rapidly charges to this voltage. When switch 10 is moved to the right, capacitor C1 discharges through the constant current circuit 11 to produce the triangular wave shown at terminal A. The magnitude of the constant current is under control of a voltage S which may be impressed between ground and terminal 30 associated with the constant current circuit 11. This voltage is representative of the divisor so that the rate at which the capacitor discharges is controlled by the magnitude of the divisor.

It can be shown that under these conditions, the wave at terminal A will have a time duration T directly proportional to the desired quotient represented by the ratio of the voltage D to the voltage S. The initial voltage of this triangular wave will, of course, be voltage D as indicated.

In order to translate the time T into a voltage representing the desired quotient, the wave at terminal A is caused to operate a square wave generator which may comprise buffer amplifier 12 and the flip-flop circuit 13 shown in FIG. 1. It will be understood that, when the triangular wave is initiated, the amplified output from amplifier 12 causes the flip-flop circuit 13 to initiate the rectangular wave shown at terminal B. As the voltage of the triangular wave returns to the proximity of zero, the flip-flop circuit 13 returns to its initial condition, thereby terminating the rectangular wave so that its time duration will also be substantially T. Flip-flop circuit 13 thus has two operating states evidenced by voltages E and zero, respectively, of the rectangular wave at terminal B.

The constant current circuit 14 is designed to be under control of the voltage of the rectangular wave at terminal B so that, so long as this voltage is zero, the constant current circuit is disabled. However, immediately upon initiation of the rectangular wave at terminal B, a constant current $I_2$ is permitted to flow from the grounded side of source 15, through the constant current circuit 14 and into the output circuit including capacitor C3, producing the wave shown at terminal 40. Since this charging current is constant, the voltage across capacitor C3 will have a constant slope so that the voltage will continue to increase for the time T. At this instant the increase abruptly ceases and the voltage V remains constant until the capacitor is discharged. Voltage V represented by this wave is thereby made proportional to the ratio of the two voltages D and S as required.

It will be noted that a switch 9 is connected across capacitor C3 and that this switch is ganged with switch 10 so that, during the period that switch 10 connects capacitor C1 to terminal 20, switch 9 will insure that capacitor C3 is fully discharged. Switch 9 opens at the instant switch 10 moves toward its right hand contact to begin the discharge of capacitor C1. This permits capacitor C3 to begin its charge cycle from the constant current source 14.

In the embodiment shown in FIG. 1, any kind of constant current circuit capable of having its current under control of a voltage which can represent the divisor may be used and a similar circuit may also be used for the constant current circuit 14. In the latter case, voltage E determines the magnitude of current $I_2$.

Figure 2:
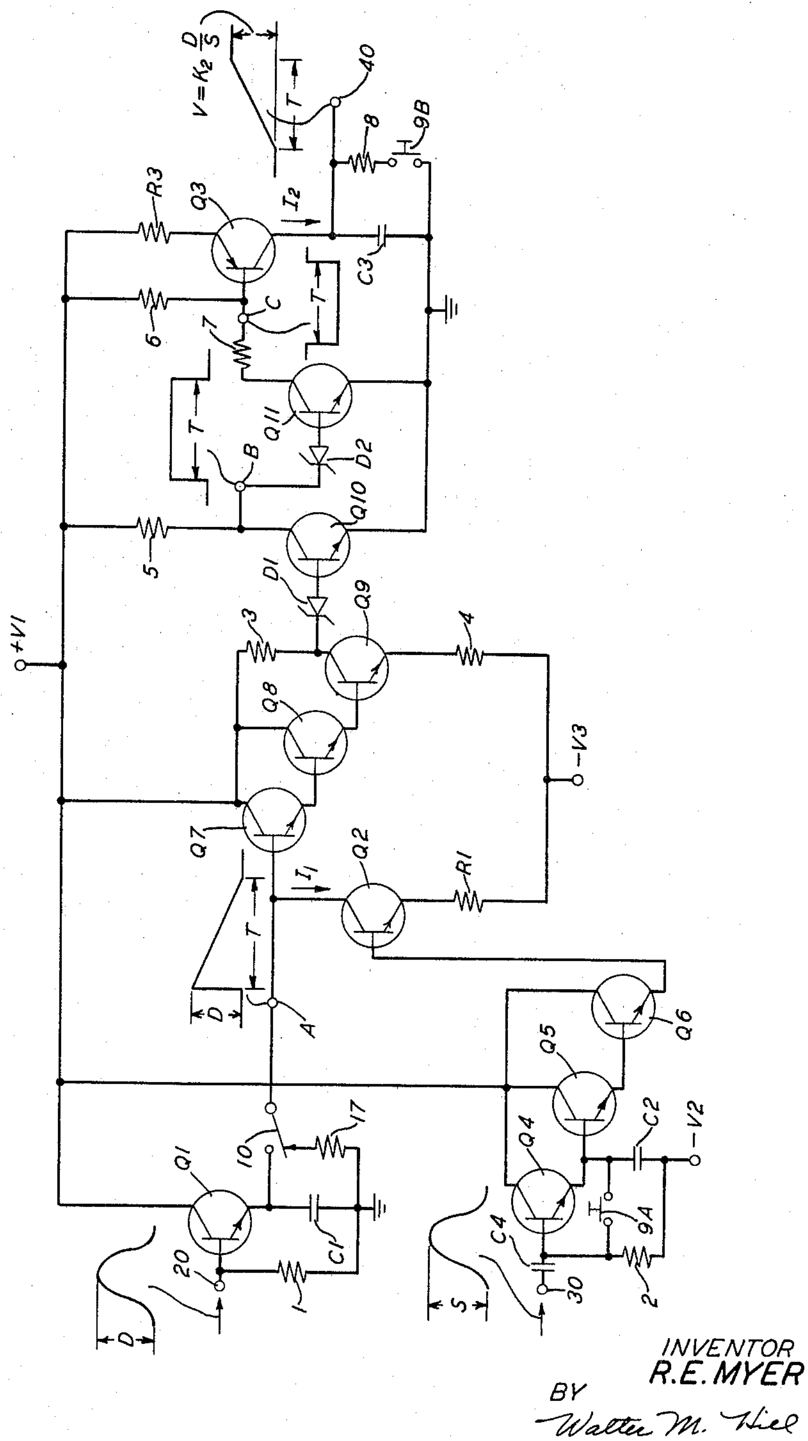
FIG. 2 is a detailed circuit diagram disclosing a preferred embodiment of the invention employing solid state devices.

The circuit arrangement in FIG. 2 comprises solid state devices and for that reason may be made very compact with an inherently very high speed operation. The result is that a quotient voltage at output terminal 40 is obtained with only an extremely short delay after the division operation is commenced. The voltage representing the dividend is impressed on input terminal 20 which causes capacitor C1 to charge to a voltage equal to this input voltage through transistor Q1. When this voltage D is impressed on terminal 20, capacitor C1 is caused to very rapidly charge by current from source V1, through the collector-emitter path of transistor Q1 and through capacitor C1. Capacitor C1 will charge until its voltage substantially equals voltage D at which instant it causes the emitter-base junction of transistor Q1 to cut off, thereby terminating the charge. Capacitor C1 will have the voltage charge D trapped thereon by this cut-off action. A resistor 1 is connected between the base and ground to insure that the base will be at ground potential until the voltage pulse is received.

Voltage D may be impressed on terminal 20 either from a constant direct voltage source of that magnitude or it may be impressed in the form of a short time duration voltage pulse. The pulse illustrated in FIG. 2 will be recognized as a detected video pulse and may have a time duration less than one microsecond.

Transistor Q2 and its circuit comprises the constant current discharge path for capacitor C1. The magnitude of the current which flows through this circuit is determined by the potential applied to the base of this transistor. This is obtained from capacitor C2 associated with transistors Q4, Q5 and Q6. Prior to applying the voltage pulse S, proportional to the divisor, to terminal 30, a switch 9A is momentarily closed to permit capacitor C2 to discharge through resistor 2 so that the divisor voltage may be impressed on capacitor C2 beginning with an initial state of complete discharge. It might be mentioned at this point that at the same instant switch 9A is closed switch 9B, shown at the extreme right of FIG. 2, is also closed to cause capacitor C3 to completely discharge through resistor 8. The voltage pulse S is transmitted to the base of transistor Q4 through a capacitor C4. This causes capacitor C2 to reach a charge equal to voltage S through a circuit path beginning with voltage source V1, through the collector-emitter path of transistor Q4 and capacitor C2. The operation of this circuit is essentially the same as that previously described for transistor Q1 and capacitor C1. Since the lower terminal of capacitor C2 is returned to a negative voltage —V2, resistor 2 insures that the base of transistor Q4 will initially be at the same potential. Consequently, when the voltage pulse S is received it causes the capacitor C2 to take on a charge represented by voltage S.

Voltage —V3 is more negative than voltage —V2, the former being connected to the lower end of resistor R1 in the constant current discharge circuit. This causes the base and emitter paths of transistors Q2, Q6, Q5 and Q4 to be normally very slightly forward-biased so that only a very small current can flow through any of these transistors before applying the voltage S. When the voltage pulse charges capacitor C2, the base-emitter junctions of transistors Q5 and Q6 become more strongly forward-biased so that the voltage on capacitor C2 is applied to the base of transistor Q2 to control the constant current $I_1$. This current, of course, cannot begin to flow until capacitor C1 is connected to terminal A by the closure of switch 10. At this instant the voltage wave at terminal A starts because capacitor C1 then discharges at a current rate $I_1$ under control of the voltage pulse S trapped on capacitor C2. Therefore, the time duration of the triangular wave at terminal A will be a direct measure of the ratio of voltage D to voltage S as previously described for FIG. 1.

The square wave generator in FIG. 2 comprises transistors Q7, Q8, Q9 and Q10 and the Zener diode D1. The square wave pulse appears at terminal B. The operation of this portion of the circuit may be understood by first explaining the initial conditions of the circuit. Prior to the instant switch 10 is operated, terminal A is at substantially ground potential because of its connection to ground through resistor 17. This causes transistors Q7 and Q8 to conduct very slightly and transistor Q9 to be biased as a linear amplifier by reason of the circuit through resistor 4 to the —V3 terminal of the power supply. Resistors 3 and 4 are so selected that the collector of Q9 is made sufficiently positive to drive diode D1 just into its reverse breakdown region, thereby switching transistor Q10 into conduction and bringing its collector, and consequently terminal B, to substantially ground potential. The collector of transistor Q10 is supplied by current from source V1 through resistor 5. The emitter, of course, is connected to the grounded terminal of the power supply.

At the instant switch 10 is closed, terminal A suddenly rises to voltage D as indicated by the triangular waveform. This causes the transistor chain Q7 and Q8 to drive transistor Q9 into a strongly conducting state. The effect of this is to sufficiently lower the collector potential of transistor Q9 to bring diode D1 out of its reverse breakdown condition thereby removing the current to the base-emitter junction of transistor Q10 and cutting this transistor off. The voltage at terminal B thereupon immediately rises from substantially ground potential to a voltage approximating the Zener voltage of diode D2. This voltage condition at terminal B continues for the time T at which instant the voltage immediately returns to ground potential by reason of the return of transistors Q7, Q8 and Q9 and diode D1 to their initial conditions in response to the return of the voltage at terminal A to substantially ground potential.

To review very briefly the overall function of this square wave generator circuit, transistor Q10 remains strongly conductive so long as the voltage at terminal A remains substantially zero. During the time that the voltage at terminal A is appreciably above zero, this margin being made very small by reason of the gain of the transistor chain Q7, Q8 and Q9, transistor Q10 is driven to cut-off thereby creating the rectangular wave shown at terminal B.

Transistor Q3 and its circuit provides a constant current $I_2$ to charge capacitor C3. This constant current flows from source V1, through resistor R3 and the emitter-collector path of transistor Q3, returning to the grounded side of the source through capacitor C3. The magnitude of this constant current is determined by the potential applied to the base of transistor Q3. This potential is controlled by transistor Q11 and Zener diode D2. Under the initial conditions, when terminal B is at substantially ground potential, diode D2 and transistor Q11 are both nonconducting, thereby causing terminal C and the base of transistor of Q3 to assume a potential substantially that of source V1. Under these circumstances, transistor Q3 cannot conduct. When the square wave is initiated at terminal B, it drives diode D2 into its reverse conducting region and causes transistor Q11 to conduct. Terminal C then suddenly assumes a lower positive potential as represented by the rectangular wave associated with it and the magnitude of this pulse is predetermined by the relative resistance values of resistors 6 and 7. As this amplitude is fixed by these resistors, the magnitude of the constant current $I_2$ remains fixed. The result is that capacitor C3 is charged at a constant rate to produce the wave associated with terminal 40. As previously described with reference to FIG. 1, this voltage continues to rise at a constant rate throughout the interval T and abruptly ceases to rise the instant the rectangular wave at terminal B drops to zero, leaving the quotient voltage V trapped on capacitor C3.

The operation of the circuits of FIG. 2 will be briefly summarized. A voltage representing the dividend is trapped on capacitor C1 and a voltage representative of the divisor is trapped on capacitor C2. This latter voltage determines the current rate $I_1$ at which capacitor C1 is discharged, thereby providing the triangular wave shown at terminal A. This wave will continue for a period of T seconds. Just prior to the initiation of this triangular wave, diode D1 and transistor Q10 are conducting while diode D2 and transistor Q11 are non-conducting. Throughout the period that the triangular wave exists these conducting states are reversed so that diode D1 and transistor Q10 are cut off while diode D2 and transistor Q11 are conducting. The conducting period for diode D2 and transistor Q11 is, therefore, equal to the time duration of the triangular wave. During this period, transistor Q3 is charging capacitor C3 at a constant rate of $I_2$ amperes so that the voltage rise on capacitor C3 is linear. This rise abruptly ceases at the end of the period T, the capacitor retaining thereon a charge proportional to the desired quotient.

While this invention has been described with specific reference to particular embodiments, it will be quite evident to those skilled in this art that other specific circuits may be substituted for those shown to provide the equivalent functions without departing from the scope of this invention.

What is claimed is:

1. A circuit for determining the ratio of two numbers represented by direct voltages comprising a first capacitor having an initial voltage charage condition, means coupled to said capacitor for changing its voltage charge condition by an amount representing the dividend of said ratio, means connected to said capacitor for restoring its initial voltage charge condition at a constant current rate, said rate being representative of the divisor of said ratio, a circuit means having two operating states, means connecting said circuit means across said first capacitor so that said circuit means will assume its first operating state at the changed voltage charge condition of said first capacitor and assume its second operating state when said capacitor's initial voltage charge condition is restored, a second capacitor and a constant current charging circuit therefor, said constant current charging circuit being coupled to said circuit means and to said second capacitor and so constructed as to charge said second capacitor at a constant rate only in response to said first operating state of said circuit means.

2. A circuit for computing the quotient of two numbers represented by direct voltages comprising a first capacitor, means coupled to said capacitor for charging it to a voltage representing the dividend, a constant current circuit having a means for adjusting said current to a value representing the divisor, means connecting said capacitor to said constant current circuit to substantially completely discharge said capacitor at a constant rate so that the discharge time is representative of the quotient, a circuit means having two operating states, a means coupling said circuit means across said first capacitor so that said circuit means will assume its first operating state while said capacitor is in a charged condition and assume its second operating state when said capacitor reaches its discharged condition, a second capacitor, a constant current charging circuit therefor, said constant current charging circuit being coupled to said circuit means and to said second capacitor and so constructed as to charge said second capacitor at a constant rate only in response to said first operating state of said circuit means.

3. The combination of claim 2 wherein the means for charging said first capacitor comprises a transistor having a base, an emitter, and a collector, said first capacitor being connected in series with the collector-emitter path of said transistor, and means for applying the voltage representative of the dividend across a circuit including said base, said emitter and said first capacitor in series.

4. The combination of claim 2 wherein said constant current circuit and said constant curent charging circuit each comprises a resistor, a transistor having a base, an emitter and a collector, said emitter being connected to said resistor to form a series circuit of said resistor and the emitter-collector path of the transistor, and means for connecting a control voltage between said base and the resistor end of said series circuit to control the magnitude of the constant current.

References Cited by the Examiner

UNITED STATES PATENTS

| | | | |
|---|---|---|---|
| 3,047,232 | 7/62 | Patterson | 235—195 |

OTHER REFERENCES

Owen: "Function Generator," IBM Technical Disclosure Bulletin, vol. 3, No. 2, July 1960, pages 40 and 41.

MALCOLM A. MORRISON, *Primary Examiner.*